United States Patent

[11] 3,590,559

| [72] | Inventors | Kenneth R. Bragg<br>Redondo Beach;<br>Richard A. Nichols, Santa Monica, both of, Calif. |
|---|---|---|
| [21] | Appl. No. | 711,020 |
| [22] | Filed | Mar. 6, 1968 |
| [45] | Patented | July 6, 1971 |
| [73] | Assignee | Parker-Hannifin Corporation<br>Cleveland, Ohio |

[54] FUEL TANK INERTING SYSTEM
30 Claims, 3 Drawing Figs.

[52] U.S. Cl................................................ 55/160,
  55/21, 55/47, 220/88, 261/77, 261/124
[51] Int. Cl............................................... B01d 19/00
[50] Field of Search........................................ 55/44, 47,
  52, 53, 159, 160, 196; 158/50.1; 220/88; 261/76,
  77, 78, 115, 119, 121, 124

[56] References Cited
UNITED STATES PATENTS

| 2,341,268 | 2/1944 | Davis, Jr | 220/88 |
| 2,586,839 | 2/1952 | Mapes | 220/88 |
| 2,983,405 | 5/1961 | Tayler | 220/88 |
| 3,119,916 | 6/1965 | Kurpit et al. | 55/94 X |
| 3,229,446 | 1/1966 | Sebastian et al. | 55/53 |

FOREIGN PATENTS

| 833,898 | 5/1960 | Great Britain | 220/88 |

Primary Examiner—Samih N. Zaharna
Assistant Examiner—R. W. Burks
Attorney—John N. Wolfram ABSTRACT: An inerting system to prevent fire and explosion within aircraft or other fuel tanks by maintaining in the ullage thereof an inert atmosphere and by removing oxygen from the fuel when pressure on the fuel decreases, as during the climb of aircraft, such removal of oxygen being accomplished by injecting a mixture of fuel and an inert gas into the fuel supply through submerged nozzles.

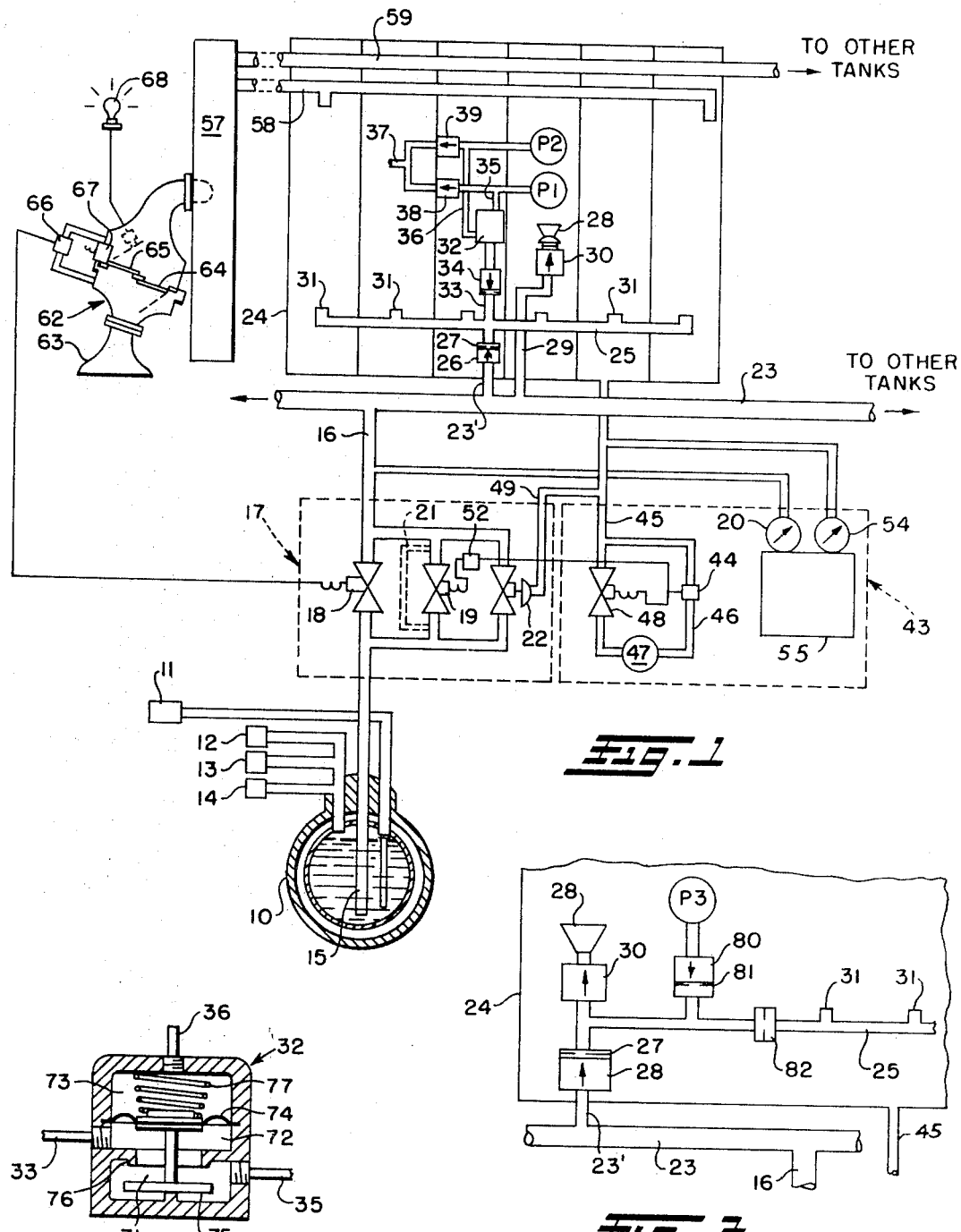

FUEL TANK INERTING SYSTEM

BACKGROUND OF THE INVENTION

Heretofore, it has been contemplated to employ an inert gas, such as nitrogen, in fuel tanks to pressurize the fuel therein and to prevent entrance of air into the tank when the tank pressure decreases relative to ambient pressure, as during descent of an aircraft. In this way explosive vapor in the tank is diluted and/or purged so that the oxygen content of the ullage is less than will support ignition or explosion. However, hydrocarbon fuels dissolve oxygen in proportion to the gas pressure at the gas-fuel interface and therefore as tank pressure decreases, as by removal of fuel therefrom, or in the case of an aircraft by reducing tank pressure during ascent, the fuel will become supersaturated with oxygen. Unless the excess oxygen is removed from the liquid fuel in a controlled manner, it may be released in an unpredictable manner and create dangerous conditions. Thus with uncontrolled release, the oxygen may be suddenly released into the ullage, as by buffeting of the airplane in turbulent air, and raise the oxygen content of the ullage to an unsafe level, or it may be released at the intake region of the boost pumps that deliver fuel to the engine and cause temporary cavitation of the pump and starving the engine.

SUMMARY OF THE INVENTION

The present invention provides means for creating and maintaining an inert atmosphere within the vapor space of a fuel tank and also for removing excess oxygen from the fuel when the latter becomes supersaturated with oxygen due to decrease of pressure within the tank. Maintaining of an inert atmosphere is accomplished by introducing an inert gas, in lieu of air, into the tank when the tank pressure must be increased, as during descent of an aircraft, to prevent structural damage to the tank due to negative pressure relative to ambient.

Removal of oxygen from the fuel is accomplished by injecting a mixture of fuel and an inert gas into the body of fuel through a series of nozzles located near the bottom of the tank upon predetermined increments of pressure decrease in the tank. The injected gas forms bubbles that absorb oxygen in the fuel and carries it to the tank vapor space from which it is purged to atmosphere in a manner to maintain an inert atmosphere in the tank.

Mixing of liquid fuel with the inert gas imparts high kinetic energy to the gas as it passes through the nozzles resulting in gas bubbles of much smaller size and greatly increased number than obtainable by dispersing gas alone with the same pressure at the nozzle inlet. The greater number of bubbles provides increased total bubble area for contact and absorption of dissolved oxygen by the bubbles, as well as a wider distribution of bubbles throughout the tank. Moreover, the smaller bubbles rise more slowly through the body of fuel, thus increasing the available time in which to contact and absorb oxygen. The net result is a highly efficient system that utilizes a minimum of inert gas for removing a given amount of oxygen from fuel.

Although the removal of oxygen from fuel in a controlled manner and pressurization of the tank with an inert gas is particularly desirable in aircraft whereby the fuel tank may be maintained in a safe condition at all times; that is, during standing on the ground, during refueling, during ascent and cruise, and during descent, it is also desirable in some ground tanks and at least portions of the system and principles herein-described are useful for the latter type of installations.

DESCRIPTION

FIG. 1 is a schematic diagram of one form of the invention in which a mixture of fuel and an inert gas are utilized for removing oxygen from the fuel;

FIG. 2 is a schematic cross section view of a block valve used in the FIG. 1 form of the invention;

FIG. 3 is a schematic diagram of another form of the invention utilizing a different pumping arrangement for the fuel to be mixed with the inert gas.

In FIG. 1, the inerting system includes an insulated dewar 10 for storing inert gas, such as nitrogen, which has been conditioned to boil at 100 p.s.i. Connected to the dewar is a self-closing filler valve 11, a capped vent fitting 12, a relief valve 13, and a burst disc 14.

An outlet conduit 15 leads from the dewar to a control unit 17 that has a large capacity solenoid operated pressurization valve 18, a small capacity solenoid operated scrub valve 19 and a pressure regulator valve 22, these valves being connected in parallel with conduits 15 and 16.

A pressure gauge 20 is connected to conduit 16 and the latter leads to a distribution conduit or manifold 23 having a branch conduit 23' leading therefrom into fuel tank 24 and having other branch conduits, not shown, leading to other fuel tanks.

Manifold 23 connects to a scrub manifold 25 via conduit 23', a relief valve 26 and a restrictor orifice 27 and also connects to a fog nozzle 28 via a relief valve 30. Scrub manifold 25 has a series of nozzles 31 and is connected to a block valve 32 by means of a conduit 33 and a check valve 34. Block valve 32 in turn is connected to pumps P₁ and P₂ via lines 35 and 36 which are also connected to fuel feedline 37 via check valves 38, 39. Pumps P₁ and P₂ are those normally supplied within a fuel tank for feeding fuel to the aircraft engines.

A scrub sequencer unit 43 includes a pressure differential operated electrical switch 44 that is connected on one side by a conduit 45 with fuel tank 24 and connected at its other side by conduit 46 with a reference tank 47. The latter is connected to conduit 45 by way of a solenoid operated on-off valve 48. Conduit 45 is connected by a branch conduit 49 to pressure regulator valve 22. Pressure switch 44 is also connected to a timer 52 which in turn is electrically connected to scrub solenoid valve 19. Conduit 45 also has connected to it a pressure gauge 54 and a switchbox 55 may be provided for a purpose described below.

The upper ends of tank 24 and other tanks not shown are connected to a surge tank 57 by means of conduits 58 and 59 and hence the pressures within the tanks will be substantially equal at all times. A climb and dive valve assembly 62 has one end communicating with surge tank 57 and the other end with a vent scoop 63 that is open to atmosphere. The assembly includes a spring closed climb valve 64 and another spring closed dive valve 65, whose open positions are shown by dotted lines. Valve 65 is also operable to an open position by a solenoid 67. A pressure differential operated electrical switch 66 has one side thereof exposed to fluid pressure in the valve assembly housing on one side of valves 64 and 65 and the other side exposed to fluid pressure on the other side of valves 64 and 65.

As shown in FIG. 2, valve 32 has an inlet chamber 71 connected to conduit 35 that leads from the discharge side of pump P₁ and has an outlet chamber 72 connected to conduit 33 that leads to check valve 34 and scrub manifold 25. The valve also has a pressure chamber 73 connected to conduit 36 that leads from the discharge side of pump P₂. A flexible diaphragm 74 separates chambers 72 and 73 and carries a valve element 75 that cooperates with a valve seat 76 to control flow of fuel from chamber 71 to chamber 72. A spring 77 biases valve 75 toward a normally open position.

OPERATION OF FIG. 1 EMBODIMENT

The FIG. 1 embodiment is particularly adapted for use in aircraft and the operation will be described in connection therewith. In this embodiment the pressure and pressure differential settings of the various pressure responsive components may be as indicated herein for purposes of illustration but may be other values, as desired. Also, the system will be described relative to fuel tank 24 but it is understood that manifold 23 is connected to all the fuel tanks in the aircraft and that each of the tanks contains inerting mechanism as shown in tank 24 and are connected with surge tank 57 by vent conduit 59.

After the aircraft has landed from a flight in which the inerting system has been utilized, the fuel tanks are only partially full and the vapor spaces are filled with nitrogen. The dewar 10 is partially full of liquid nitrogen and under a pressure of about 100 p.s.i.a. Climb and dive valves 64 and 65 are closed. Upon shutting off the aircraft electrical power, the inerting system goes into a passive mode of operation. Thus, solenoid valves 18 and 19, being deenergized are in closed position, and valve 48 is in open position.

The pressure in tank 24 will be between 0.25 and 0.75 p.s.i. above ambient. After the aircraft has been parked for a time the pressure differential may decrease to a lower value due to temperature changes or other reasons. When it has decreased to a predetermined lower value, as for example 0.125 p.s.i., regulator valve 22 will open and nitrogen will flow into the tank through conduit 45 to bring the tank pressure up to 0.25 p.s.i. above ambient and valve 22 will then close.

If the aircraft remains on the ground long enough to exhaust the nitrogen supply, the fuel tank pressure may eventually decrease to less than ambient, as for example due to temperature changes. Dive valve 65, which is set to open when the tank pressure is about 0.1 p.s.i. less than ambient, would then open and permit air to enter before a damaging negative pressure could develop within the fuel tanks. Thus, when the aircraft is standing with no electrical power, the inerting system continues to function automatically as long as the nitrogen supply lasts and then reverts to a phase to prevent damage to the tanks.

To replenish the supply of liquid nitrogen, the vent fitting 12 is uncapped and the nitrogen ground supply is connected to filler port 11 and liquid nitrogen is introduced under pressure into dewar 10. When the latter is full, the liquid nitrogen will overflow through vent fitting 12 to indicate this condition. The supply line is then disconnected from fitting 11 and vent fitting 12 is capped to close the same. The liquid nitrogen boils at 100 p.s.i.a., as previously conditioned, and as liquid nitrogen is transferred into the aircraft fuel tanks as herein described, the removal of nitrogen from the dewar will tend to drop the pressure therein but as the pressure tries to drop below 100 p.s.i.a., further boiling takes place to maintain the 100 p.s.i.a. pressure within the dewar to thus provide the force for expelling nitrogen therefrom.

When the aircraft fuel tanks are being filled with fuel with the aircraft electrical system turned off, the pressure within the fuel tank tends to rise and causes climb valve 64 to open for venting the tank to atmosphere to prevent the pressure therein from exceeding ambient by more than 0.75 p.s.i.

While the aircraft is still on the ground with its electrical power shut off, valve 48 will be in a spring opened position so that the pressure in reference tank 47 will be the same as in fuel tank 24. Upon turning on of the aircraft electrical power system in preparation for takeoff, pressure switch 44, which closes an electrical circuit when fluid pressures on the two sides thereof are balanced, will energize valve 48 to cause it to close and trap the ground level pressure of tank 24 within reference tank 47.

Upon starting the engines and boost pumps $P_1$ and $P_2$ for feeding fuel to the engines, fuel discharge from pump $P_2$ pressurizes chamber 73 via conduit 36 and maintains valve 75 in open position. At the same time, fuel discharge from pump $P_1$ enters chamber 71 via conduit 35 and passes through valve seat 76 to chamber 72 and conduit 33 from where it passes through check valve 34 into scrub manifold 25 and is injected through nozzle 31 into the main body of fuel below the top level thereof. This injecting action is continuous while pumps $P_1$ and $P_2$ are both operating simultaneously for supplying fuel to the engines from tank 24, as is normally the case.

If either pump $P_1$ or $P_2$ becomes inoperative, fuel will cease to be delivered from pump $P_1$ to manifold 25 so that all the discharge of the operative pump will be delivered to the aircraft engines. Thus, if pump $P_1$ becomes inoperative, it will have no discharge and hence will deliver no fuel through conduit 35 to valve 32 and scrub manifold 25 even though valve element 75 is held open by pressure in chamber 73. On the other hand, if pump $P_2$ becomes inoperative, it will have no discharge to pressurize chamber 73 and valve element 75 will then be closed by pressure of fuel coming into valve 32 via conduit 35 from pump $P_1$ and all the discharge from pump $P_1$ will be delivered to the aircraft engine.

While the aircraft is climbing the ambient pressure decreases. When it has dropped so that fuel tank pressure exceeds it by more than 0.75 p.s.i., climb valve 64 will open to vent the fuel tanks until their pressure has dropped to within 0.75 p.s.i. of ambient, when climb valve 64 again will close. This opening and closing action of the climb valve will continue in this manner until the aircraft has reached cruising altitude. At cruising altitude, climb valve 64 will remain closed.

Each time that climb valve 64 opens for periodically venting pressure from the fuel tanks during the climb, the pressure within the tanks, which had been between 0.125 and 0.75 p.s.i. over ambient at ground level becomes reduced.

As the tank pressure reduces, the amount of oxygen that the fuel will hold in saturated solution also reduces. However, the excess remains in supersaturated solution until it is caused to be released into the tank vapor space. If supersaturation is of sufficient magnitude, release will be effected by agitation, as by buffeting of the aircraft in turbulent weather, and create a dangerous condition. Because the scrubbing method hereindescribed effectively maintains supersaturation to a low level, agitation of the fuel supply, whether caused by motions of the aircraft or by injection of fuel alone through nozzles 31 when valve 19 is closed, does not cause release of oxygen from the fuel supply.

Each time the tank pressure drops an additional 0.5 p.s.i. either by opening of climb valve 64 or by consumption of fuel, pressure switch 44 is activated to deenergize valve 48 to open the same and also to start timer 52. Opening of valve 48 connects reference tank 47 to tank 24 to equalize the pressures therebetween and therefore establish a new reference pressure within tank 47 that is 0.5 p.s.i. lower than before. When the pressures are thus equalized, switch 44 is deactivated and valve 48 closes to trap the new reference pressure within tank 47. Meanwhile, timer 52 has opened small capacity valve 19 maintains it open for a preset time to permit small flow of nitrogen therethrough and into manifold 23 where it vaporizes and passes through relief valve 26 into manifold 25 where it mixes with fuel coming from valve 32 and is discharged through nozzles 31. The opening pressure for relief valve 26 may be quite low, as for example 1 p.s.i.g., whereas the opening pressure of relief valve 30 is on the order of 55 p.s.i.g. and hence the latter does not open at this time. If desired, the opening pressure of relief valve 26 may be higher, as for example 30 p.s.i., than the pressure developed by pumps $P_1$ and $P_2$ (but remaining lower than the opening pressure of relief valve 30) so that at no time can there be any leakage of fuel into manifold 23.

Mixing of the liquid fuel with the nitrogen gas in manifold 25 imparts high kinetic energy to the gas as it discharges from nozzles 31 and causes formation of gas bubbles of much smaller size and far greater numbers than would otherwise occur. These bubbles disperse completely throughout the fuel supply and are extremely effective for absorbing excess oxygen in the fuel and carrying it to the tank vapor space. This action of supplying nitrogen through valve 19 for scrubbing oxygen from the fuel continues until timer 52 shuts off the electrical current to valve 19 and permits the latter to close by spring action.

As the aircraft continues to climb, vent valve 64 continues to drop the pressure of the fuel within the tanks and the release of nitrogen through valve 19 under the control of switch 44, as well as the adjustment of the reference pressure in tank 47, will be repeated each time the pressure within the tank drops an increment of 0.5 p.s.i. If the aircraft flies level for a period of time, valve 19 remains closed until the climb starts again. If the aircraft descends and climbs again, the pressure within reference tank 47 remains at the pressure it had at the highest point of the original climb and opening of valve 19 does not occur again until a higher altitude is reached. If the aircraft climbs rapidly enough so that the fuel tank pressure drops an increment of 0.5 p.s.i. in less time than valve 19 is maintained in open position by timer 52, switch 44 will be reactivated before valve 19 closes so that feed of nitrogen through valve 19 will be continuous during this part of the climb.

As fuel is used during cruise at level altitude, or as ambient pressure rises during descent, the fuel tank pressure tends to become lower than ambient pressure. When it is within 0.25 p.s.i. of ambient, pressure switch 66 is activated to energize and open solenoid valve 18. Because the lowering of the pressure within the tank relative to ambient can occur quite rapidly, particularly when the aircraft is in a dive, valve 18 is of large flow capacity and permits a relatively large flow of nitrogen into manifold 23 to develop a pressure therein sufficient to open relief valve 30 as well as relief valve 26. Nitrogen will thus rapidly enter tank 24 through fog nozzle 28 and nozzles 31 to prevent tank pressure from becoming less than ambient. As a result, dive valve 65 never opens to admit air into the tank during normal operation but it would open if for any reason the nitrogen pressurizing system failed. As soon as the nitrogen has brought the tank pressure to the point where it is 0.75 p.s.i. greater than ambient, pressure switch 66 will be deactivated to deenergize solenoid valve 18 and permit the latter to close, it being a spring closed valve.

When the valve 18 is open, the liquid nitrogen passing therethrough may vaporize within manifold 23 but if the flow is great enough to prevent complete vaporization fog nozzle 28 disperses the liquid nitrogen into the tank in finally divided form where it will vaporize. This eliminates the need for a heat exchanger, provision for ducting of the heat source, and associated controls.

The saturation level of nitrogen in dewar 10 is selected so that boiling occurs at about 100 p.s.i.a. at a temperature of about −283°. The highest pressure obtainable in manifold 23 is about 70 p.s.i.a. due to the setting of relief valve 30, at which pressure the temperature of the nitrogen within manifold 23 is about −290°. Thus the temperature of the nitrogen in all parts of the system is higher than the condensation temperature of oxygen at the conditions normally encountered and condensation of oxygen from ambient air, and the resulting dangerous condition, is avoided.

In the event of a crash landing with rupture of a tank and with electrical power either lost or shut down, the pressure within the tanks will decrease and such decrease will be sensed by valve 22 by way of conduits 49 and 45. When the tank pressure has decreased to one-eighth p.s.i. over ambient valve 22 will open to pass nitrogen into the fuel tanks and it will again close before the fuel tank pressure reaches the climb valve 64 cracking pressure of 0.75 p.s.i. differential to avoid unnecessary loss of nitrogen through the climb valve.

Pressure gages 20 and 54, and solenoid 67, permit checking operability of the system and its components both in flight and on the ground. Thus, actuation of the various valves 18, 19, 22, 48, 64 and 65, either during normal operation of the inerting system or by manually actuated checkout procedures with suitable switches in box 55, will result in characteristic increases or decreases in pressure within conduit 16 and/or tank 24 that will be visibly reflected on gages 20 and 54 to signal proper operation. Because dive valve 65 normally does not open, its operability may be checked by means of a solenoid 67 which when energized by a manual switch will open the valve and cause the pressure in tank 24 to change, which change is reflected on gage 54. A light 68 actuated by valve 65 in its open position gives a warning of such condition.

THE EMBODIMENT OF FIG. 3

The form of the invention shown in FIG. 3 differs from that of FIG. 1 primarily in that pump $P_3$ used only for the inerting system is substituted in the inerting system for boost pumps $P_1$ and $P_2$, and also in that relief valve 30 and nozzle 28 are connected to manifold 23 by way of conduit 23' rather than conduit 29. Pump $P_3$ is controlled by switch 44 to operate only when valve 19 is open. Thus, during climb when valve 64 intermittently opens to drop the pressure within tank 24 and pressure switch 44 operates to open valve 48 and 19, the switch, through timer 52, also turns on pump $P_3$ for a preset time interval corresponding to the time that valve 19 is open. Pump $P_3$ takes in fuel from the tank and discharges it into spray manifold 25 through relief valve 80 and orifice 81 where it mixes with gaseous nitrogen then entering manifold 25 and supplied through valve 19. The mixture sprays into the bottom of the main body of fuel through nozzle 31 after passing through orifice 82 to release excess oxygen therein due to supersaturation from lowered tank pressure and carries it to the ullage from which it is subsequently purged to atmosphere through climb valve 64, as already described.

OTHER FORMS OF THE INVENTION

If desired, a restricted passage may be provided for constantly bleeding nitrogen at a low flow rate from the dewar to manifold 23, as for example, by a constantly open bypass port in valve 19 diagrammatically indicated at 21 in FIG. 1. Such a bleed could be useful in providing inerting protection in lieu of valve 22 when the aircraft is on the ground with electrical power shut off.

In another modification, it is possible for some applications to omit mixing of fuel with the nitrogen and to utilize valve 19 for supplying nitrogen alone to nozzles 31 for scrubbing the fuel at intervals as already described.

Likewise, other variations of the system and its components and the use thereof may be made within the scope of the invention as defined by the claims.

We claim:

1. An inerting system comprising a tank containing a liquid fuel under pressure, first means for releasing oxygen dissolved in said fuel, and second means responsive only to a predetermined drop in said pressure for actuating said first means.

2. The system of claim 1 in which said first means includes a means to introduce an inert fluid in gaseous form into said fuel below the level thereof.

3. The system of claim 1 in which there is a container separate of the tank and in communication therewith for collecting fuel vapor forming in the tank, and in which a third means automatically operates when the pressure upon the fuel bears a predetermined relationship to the ambient pressure for venting the tank to atmosphere through said container.

4. The system of claim 1 in which said first means includes a means for introducing an inert fluid into the liquid fuel through the conduit and in which there is a third means continuously supplying inert fluid to the tank through said conduit.

5. An inerting system for a fuel tank comprising a first means operable to introduce an inert fluid into the fuel tank in a manner for releasing oxygen dissolved in the fuel, and a second means automatically responsive to a reduction in ambient pressure for actuating the first means.

6. An inerting system comprising a tank containing a liquid fuel under pressure, first means for releasing oxygen dissolved in said fuel, and second means responsive to a predetermined drop in said pressure for actuating said first means, and means for establishing a reference pressure other than ambient pressure, and said predetermined drop in pressure is with respect to said reference pressure.

7. The system of claim 6 in which there is a means that reduces the reference pressure upon a predetermined drop in the pressure upon the fuel.

8. The system of claim 5 in which there is a means causing said reference pressure to drop incrementally in response to successive predetermined incremental drops in the pressure upon the fuel.

9. An inerting system comprising a tank containing a liquid fuel under pressure, first means for releasing oxygen dissolved in said fuel, second means responsive to a predetermined drop in said pressure for actuating said first means, and means for limiting operation of the first means for a predetermined time upon actuation thereof.

10. The system of claim 1 in which said first means includes means to introduce an inert fluid into the fuel and there is a third means to introduce additional quantities of said inert fluid into the tank.

11. An inerting system comprising a tank containing a liquid fuel under pressure, first means for releasing oxygen dissolved in said fuel, second means responsive to a predetermined drop in said pressure for actuating said first means, said predetermined drop in pressure is with respect to a reference pressure other than ambient, and in which there is a means to equalize the reference pressure with the pressure upon the fuel upon a predetermined drop in the latter to establish a new reference pressure.

12. An inerting system comprising a tank containing a liquid fuel under pressure, first means for releasing oxygen dissolved in said fuel, second means responsive to a predetermined drop in said pressure for actuating said first means, said first means including an inert fluid injected into said fuel from a first conduit having an opening within the tank, and third means responsive to a predetermined relationship of said fuel pressure and ambient pressure for introducing an additional supply of said inert fluid to said tank through a second conduit separate of said first conduit.

13. An inerting system comprising a tank containing a liquid fuel under pressure, first means for releasing oxygen dissolved in said fuel, second means responsive to a predetermined drop in said pressure for actuating said first means, said first means including an inert fluid injected into said fuel from a first conduit having an opening within the tank, third means responsive to a predetermined relationship of said fuel pressure and ambient pressure for introducing an additional supply of said inert fluid to said tank through a second conduit separate of said first conduit, said first and second conduits branching from a common third conduit, and said fluid being supplied to said third conduit under the control of two separate valves, one of said valves being included in said first means and the other of said valves being included in said third means.

14. The system of claim 13 in which said first conduit includes a first one-way valve openable by fluid pressure in said third conduit and through which said fluid flows from the third conduit to said first conduit, and said second conduit includes includes a second one-way valve openable by fluid pressure in said third conduit and through which said fluid is delivered from the third conduit to the tank, said second one-way valve having a higher opening pressure than the first one-way valve.

15. An inerting system comprising a tank containing liquid fuel, means for mixing a first fluid and an inert fluid and means for introducing the mixture into the tank below the level of fuel therein whereby the inert fluid forms gas bubbles within the liquid fuel in the tank to absorb oxygen dissolved in the fuel.

16. The system of claim 15 in which the first fluid is said fuel and the inert fluid is an inert gas, and the first fluid and gas are mixed in a scrub manifold and injected into said fuel by a means causing a wide dispersion of said gas in the fuel in the form of small bubbles that absorb oxygen from the fuel and carry it to the tank ullage.

17. The system of claim 15 in which the first fluid and the inert fluid are delivered from separate sources to a common scrub manifold for mixing therein and injection therefrom into said fuel, and there are means to prevent backflow from the manifold to each source.

18. The system of claim 17 in which the means to prevent backflow from the scrub manifold to the source of said inert fluid is a relief valve having an opening pressure greater than the delivery pressure of said first fluid into said scrub manifold to preclude flow of said first fluid to said inert fluid source when said relief valve is open.

19. The system of claim 15 in which the first fluid and said inert fluid are mixed in a manifold, said first fluid is said fuel and there is a pair of pumps that normally operate simultaneously to deliver fuel to an engine, a valve between both pumps and the manifold, said valve being response to simultaneous discharge from both pumps to deliver fuel to the manifold and being responsive to loss of discharge from either pump to cut off the flow of fuel to the manifold.

20. An inerting system comprising a tank containing liquid fuel under pressure, first means responsive to successive predetermined increments of decrease in said pressure irrespective of ambient pressure for bubbling an inert gas through said fuel to release oxygen therefrom, second means for venting the tank to atmosphere, said second means being normally closed and actuated to open position by a predetermined differential between tank pressure and atmospheric pressure.

21. The system of claim 20 in which said increments of decrease in said fuel pressure are with respect to a reference pressure and said reference pressure is that of a fluid contained in a separate reservoir connected to said tank, a first valve between the tank and reservoir, and said first valve being responsive to a pressure differential operated device that causes the first valve to open for equalizing the tank and reservoir pressure each time the tank pressure drops a predetermined increment.

22. The system of claim 21 in which said first means includes a second valve operated by said device for controlling the supply of said inert gas to said fuel.

23. The system of claim 21 in which said first means includes a second valve for controlling the supply of said inert gas to said fuel, said second valve being controlled by a timer actuated by said device for maintaining said second valve in open position for a predetermined time after said first valve closes.

24. An inerting system comprising a tank containing a body of liquid fuel, a scrub manifold having an injection opening therein submerged within the fuel, means for circulating fuel from the tank into said manifold and through said opening back into said body of fuel below the level thereof, and means for introducing an inert fluid into said tank.

25. The system of claim 24 in which said circulating means includes a pair of pumps that normally operate simultaneously to supply fuel from the tank to an engine, a valve having an inlet connected to the discharge port of one pump, an outlet connected to the manifold, and a pressure chamber connected to the discharge side of the other pump, a valve member controlling flow from the inlet to the outlet, means responsive to pressure in said chamber for actuating the valve member to an open position and means responsive to pressure in said valve inlet to close said valve member when there is no pressure in the chamber.

26. An inerting system for an aircraft fuel tank containing liquid fuel under pressure, a first means responsive to a predetermined gain in altitude of said aircraft for introducing inert fluid into said tank, and a second means response to a predetermined differential between said tank pressure and ambient pressure for introducing inert fluid into said tank.

27. The system of claim 26 in which there is a third means responsive to another predetermined differential between tank pressure and ambient pressure for introducing inert fluid into said tank.

28. A firs prevention system for an aircraft comprising a supply of an inert fluid in liquid form at a low temperature and under pressure, a location in the aircraft to be protected against fire, a conduit connecting said supply to said location, means communicating the interior of the conduit with said location, means controlling flow of the fluid through the conduit from the supply to the communicating means for discharge through the latter, means for maintaining the temperature of the conduit whereby the conduit serves as a heat exchanger to deliver heat 29. A fire prevention system comprising a supply of inert fluid in liquid form at a low temperature and under pressure, means defining a space containing combustible material, a conduit connecting said supply to said space, means communicating the interior of the conduit with said space, means controlling flow of the liquid through the conduit to the communicating means, communicating means being constructed and arranged so that it discharges the liquid directly into said space in finely divided form to provide an inert atmosphere therein that is unable to support combustion within said space.

30. A fire prevention system in accordance with claim 29 in which the inert liquid is nitrogen and said liquid nitrogen is isolated from other fluids between said container and said space.

UNITED STATES PATENT OFFICE
CERTIFICATE OF CORRECTION

Patent No. 3,590,559  Dated July 6, 1971

Inventor(s) Kenneth Bragg et al.

It is certified that error appears in the above-identified patent and that said Letters Patent are hereby corrected as shown below:

Column 6, line 55, after "a" insert -- conduit and a --. Column 8, line 71, "firs" should read -- fire --. Column 9, line 4, after "the", first occurrence, insert -- supply of inert fluid lower than the temperature of the --; line 5, after "heat" insert -- to said fluid passing through the conduit to vaporize at least a portion of the same prior to said discharge through the communicating means, and a valve in said circuit upstream of the communicating means, said valve being opened by a predetermined pressure of fluid in said conduit. --.

Signed and sealed this 6th day of June 1972.

(SEAL)
Attest:

EDWARD M. FLETCHER, JR.
Attesting Officer

ROBERT GOTTSCHALK
Commissioner of Patents